(No Model.) 2 Sheets—Sheet 1.
A. H. MARTIN.
MILK COOLER.
No. 294,487. Patented Mar. 4, 1884.
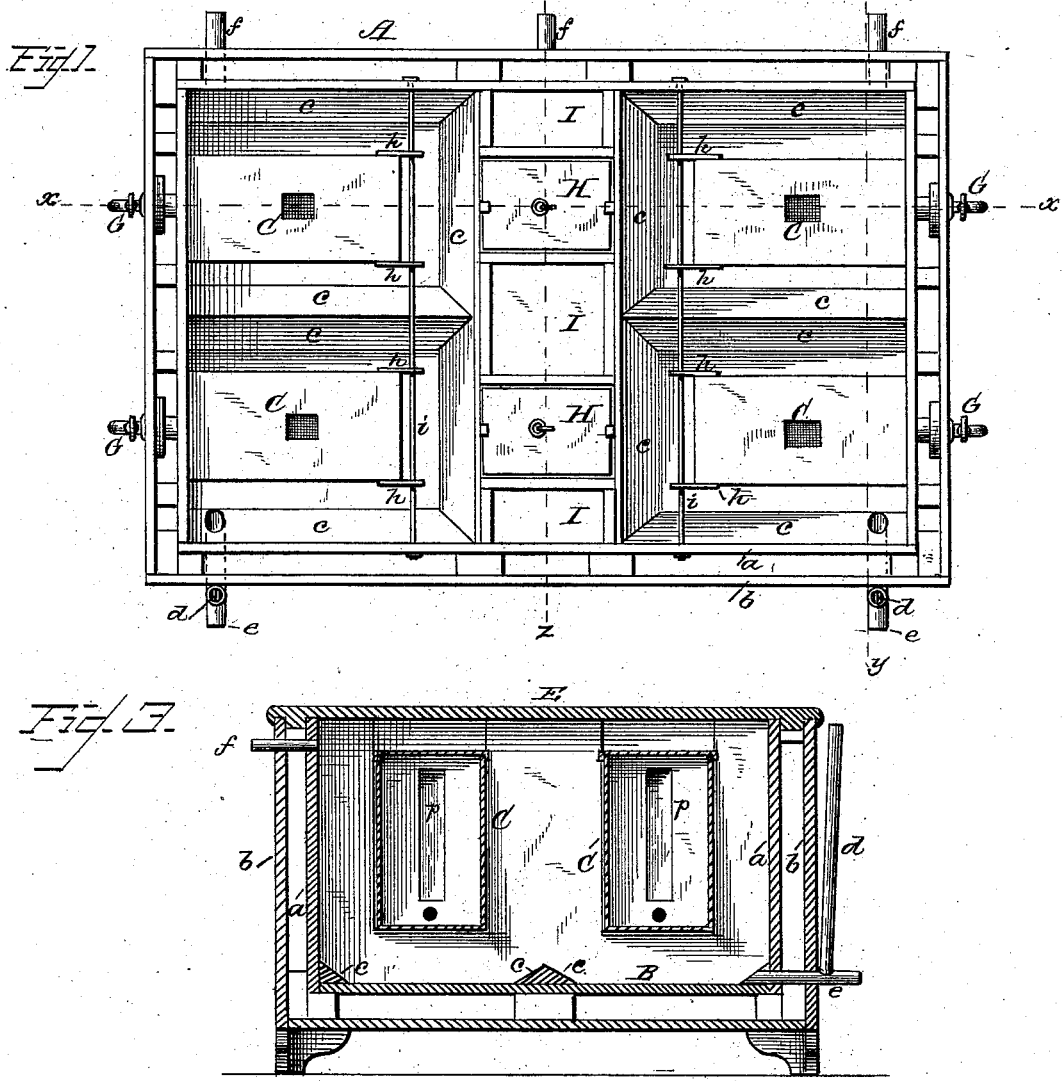
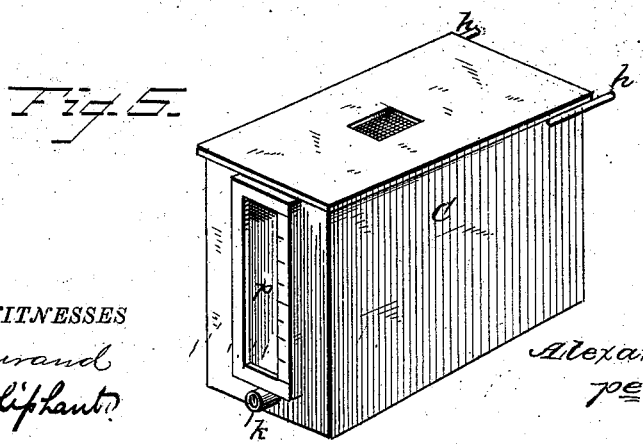
WITNESSES
F. L. Ourand
N. E. Oliphant
INVENTOR
Alexander H. Martin,
per Chas. H. Fowler
Attorney (No Model.) 2 Sheets—Sheet 2.

A. H. MARTIN.
MILK COOLER.

No. 294,487. Patented Mar. 4, 1884.

WITNESSES
F. L. Ourand
N. E. Oliphant

INVENTOR
Alexander H. Martin,
per Chas. H. Fowler
Attorney

UNITED STATES PATENT OFFICE.

ALEXANDER H. MARTIN, OF OSKALOOSA, IOWA.

MILK-COOLER.

SPECIFICATION forming part of Letters Patent No. 294,487, dated March 4, 1884.

Application filed October 13, 1883. (No model.)

*To all whom it may concern:*

Be it known that I, ALEXANDER H. MARTIN, a citizen of the United States, residing at Oskaloosa, in the county of Mahaska and State of Iowa, have invented certain new and useful Improvements in Milk-Coolers; and I do hereby declare that the following is a full, clear, and exact description of the same, reference being had to the annexed drawings, making a part of this specification, and to the letters and figures of reference marked thereon.

Figure 2:
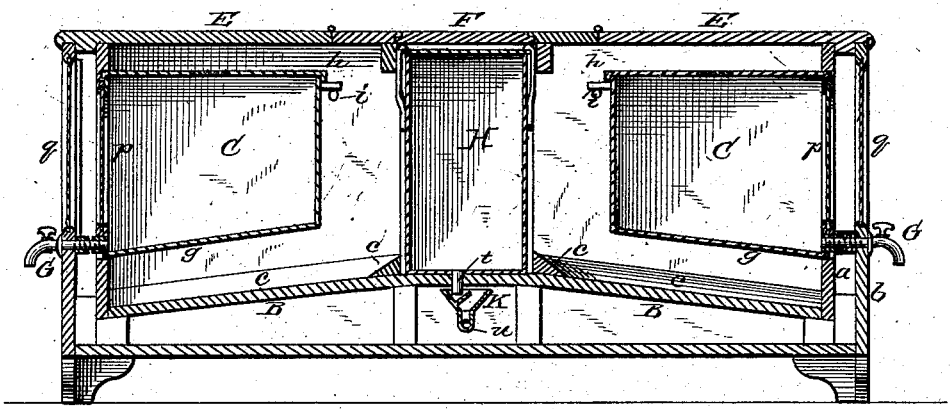
Figure 4:
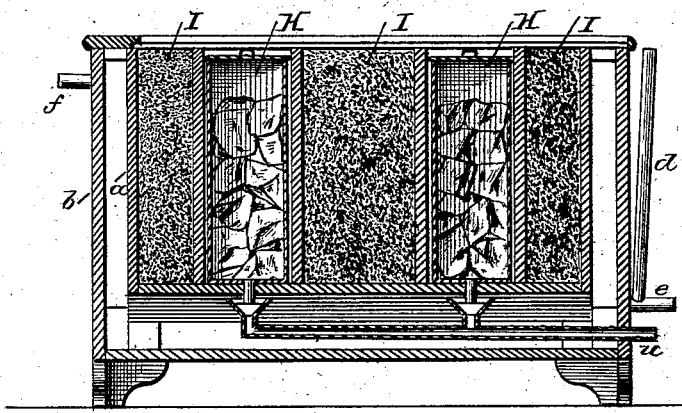
Figures 3, 5:
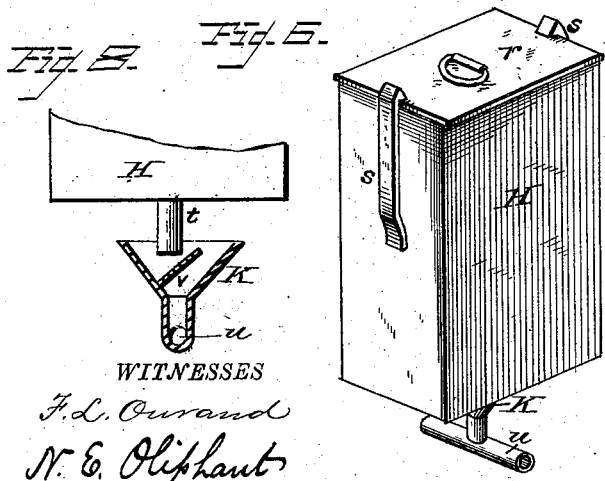
Figure 7:
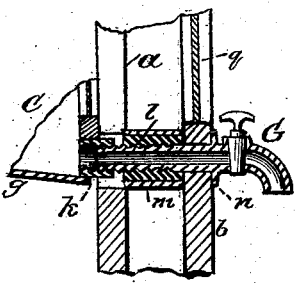

Figure 1 of the drawings is a top plan view, showing the interior construction of my improved creamery. Fig. 2 is a longitudinal section taken on line $x$ $x$ of Fig. 1, with the covers of the creamery in place over the top thereof; Fig. 3, a similar cross-section taken on line $y$ $y$ of same figure; Fig. 4, a cross-section taken on line $z$ $z$; Fig. 5, a detail perspective view of one of the milk-tanks; Fig. 6, a similar view of one of the ice-tanks; Fig. 7, a detail view in section, showing the manner of connecting the milk-tank to the faucet; and Fig. 8, a detail view, showing the lower end of one of the ice-tanks and the construction of the funnel which receives the drippings from the pipe connected to said tank.

The present invention has relation to certain new and useful improvements in that class of creameries having a series of milk-cooling tanks; and the object thereof is to provide simple and effective means whereby a continuous flow of water around the tanks is obtained to draw the heat out of the milk.

A further object of the invention is to provide the creamery with an inner or false bottom inclining downward from the center and from the sides; also, central compartments for ice and a non-heat-conducting substance, whereby an effective and successfully operating creamery is provided that can be used either summer or winter, either in the house or out of doors, and the heat and cold will have but comparatively little effect upon the milk, water, or ice.

The several objects above set forth I attain by the construction of the creamery and the general arrangement of parts, substantially as shown in the drawings, and hereinafter described and claimed.

In the accompanying drawings, A represents the creamery, having a space around its four sides, formed by the double walls $a$ $b$, to receive sawdust or other like non-conducting substance. The creamery A has a false bottom, B, inclining downward from the center thereof, and also having inclined sides $c$, to more effectually cause the water to flow toward the front end of the creamery and crowd the warmer water up to the ice, which will become cold in a very short time. The inclined sides $c$ may be of any number, according to the number of milk-tanks C that are used, so that the inclined sides will be at the inner end and sides of each tank, as more clearly shown in Fig. 1, thus forming a vat with inclined bottom and sides for each tank used. These vats are supplied with water through a pipe or pipes, $d$ $e$, extending through both walls $a$ $b$ of the creamery, an overflow-pipe, $f$, being provided for the escape of the water. The horizontal portion $e$ of the supply-pipe which enters the walls of the creamery serves also as an outlet through which to draw off the water from the vats. The wall $a$ of the creamery, as well as the inclined false bottoms and sides, may be lined with suitable sheet metal and provided with hinged covers E and a central sliding cover, F. The cream or milk tanks C have inclined bottoms $g$, to facilitate drawing off the contents, and are suspended at their inner ends by arms $h$, resting on rods $i$, passing transversely through the walls of the creamery and suitably fastened thereto. Each of the tanks C, near its lower end or inclined bottom, is provided with a screw-threaded nipple, $k$, with which engages the screw-threaded end of a suitable faucet, G, said screw-threaded end or shank of the faucet previously passing through a suitable rubber or other elastic packing, $l$, contained within a bushing, $m$, located between the walls $a$ $b$ of the creamery, as shown in Fig. 7. As the screw-threaded end of the faucet G is passed through the packing $l$ the faucet is turned until the screw-threads upon the end thereof engage with the screw-threaded nipple $k$, and the shoulder $n$ upon the faucet comes against the outer surface of the wall $b$, and by continuing to turn the faucet the tank will be drawn up in position against the wall $a$ and the nipple drawn tightly against the packing, thereby forming a perfectly tight joint and preventing leakage. The manner of suspending the tank C by the arms $h$, resting on the rod $i$, enables the tank to be moved sufficiently by the faucet G to bring the tank to an upright position, while at the same time the tank and faucet can be disconnected and either or both removed for cleaning. The tank C is provided with a suitable transparent gage, $p$, to ascertain the quantity of milk or cream contained therein, the wall $b$ opposite the front of each tank having a window, $q$, as shown in Fig. 2, so that each gage can be plainly seen from the outside of the creamery, the wall $a$ directly in front of the tank having an opening equal in size to the end of the tank for this purpose.

The creamery A has centrally located a series of ice-tanks, H, and compartments I for sawdust or other like non-conducting substance, said ice-tanks having suitable covers, $r$, secured in place by spring-catches $s$, or other suitable fastening devices. The ice-tanks H have each extending from their bottom a short pipe, $t$, which passes down through the horizontal portion of the false bottom B and enters a funnel, K, communicating with a drain-pipe, $u$, thus enabling the water in the tanks to be drawn off as rapidly as the ice melts. The funnel K is provided with a guard-plate, $v$, as shown in Fig. 8, said plate extending upward at an angle slightly above the end of the pipe $t$, and being of sufficient length to extend across the diameter of the funnel and be connected to its sides. This guard-plate prevents any warm air which may be in the pipe $u$ from passing up into the ice-tank, and is considered of value in preventing the too rapid melting of the ice.

It should be noticed that a series of vats and milk-tanks are arranged at each end of the creamery, one series of tanks, if preferred, being used for morning milking, and the other for the evening milking, this being considered advantageous for the reason that the milking in either case is not disturbed. Between the two series of milk-tanks are arranged the ice-tanks and compartments for sawdust, the two alternating with each other, the ice-tanks being on a line opposite the inner ends of the milk-tanks, thus providing means to keep the interior of the creamery cool and not affected by the outer atmosphere, as well as the contents of the milk-tanks. A continual flow of water around the milk-tanks is caused by the water next to the ice-tanks being colder than the water next to the milk-tanks, in connection with the peculiar construction of the false bottom, the cold water flowing toward the lower end of the bottom, which crowds the warmer water in a direction toward and against the ice-tanks, which also becomes cold and returns to the lower end of the false bottom, thereby drawing the heat out of the milk and greatly utilizing the water.

Each milk-tank is provided with a suitable lid or cover, having perforations or wire-gauze plates to admit of the warm air escaping and insure ventilation, the covers or lids being removed when filling the tanks with milk or for cleaning them.

Having now fully described my invention, what I claim as new, and desire to secure by Letters Patent, is—

1. A creamery provided with two rows or series of milk-tanks, between which are arranged a series of ice-tanks and a series of compartments for a non-conducting material, said ice-tanks and compartments alternating, and the former being on a line opposite the inner ends of the milk-tanks, substantially as and for the purpose set forth.

2. In a creamery, the combination, with false inclined bottom having inclined sides, as shown, to form vats for containing the milk-tanks, of a central row of ice-tanks and compartments for a non-conducting material, the two alternating with each other, and the ice-tanks being on a line opposite the inner ends of both series of milk-tanks, substantially as and for the purpose described.

In testimony that I claim the above I have hereunto subscribed my name in the presence of two witnesses.

ALEXANDER H. MARTIN.

Witnesses:
F. M. DAVENPORT,
JOHN S. CONGER.